US007854613B2

(12) United States Patent
Boykin et al.

(10) Patent No.: US 7,854,613 B2
(45) Date of Patent: Dec. 21, 2010

(54) DEMONSTRATION KIT AND METHOD FOR ENHANCING AND/OR DEMONSTRATING PHOTOACTIVE PROPERTIES

(75) Inventors: Cheri M. Boykin, Wexford, PA (US); Chia-Cheng Lin, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 710 days.

(21) Appl. No.: 11/748,707

(22) Filed: May 15, 2007

(65) Prior Publication Data

US 2007/0251304 A1 Nov. 1, 2007

Related U.S. Application Data

(62) Division of application No. 10/657,350, filed on Sep. 8, 2003, now Pat. No. 7,223,523.

(60) Provisional application No. 60/411,796, filed on Sep. 18, 2002.

(51) Int. Cl.
G09B 23/40 (2006.01)
(52) U.S. Cl. .................................................. 434/298
(58) Field of Classification Search ................. 434/126, 434/276, 298; 134/2, 3, 26, 28; 510/108, 510/467, 480, 488, 493
See application file for complete search history.

(56) References Cited

U.S. PATENT DOCUMENTS

| 4,025,340 A | 5/1977 | Takimoto et al. ............ 430/97 |
| 4,365,018 A | 12/1982 | Crutchfield et al. ......... 430/139 |
| 4,432,732 A * | 2/1984 | Yano ........................ 434/298 |
| 4,746,347 A | 5/1988 | Sensi ......................... 65/94 |
| 4,792,536 A | 12/1988 | Pecoraro et al. ............. 501/70 |
| 5,240,886 A | 8/1993 | Gulotta et al. ............... 501/71 |
| 5,242,307 A * | 9/1993 | Reinbold ................... 434/298 |
| 5,385,872 A | 1/1995 | Gulotta et al. ............... 501/71 |
| 5,393,593 A | 2/1995 | Gulotta et al. ............. 428/220 |
| 5,871,361 A * | 2/1999 | Gastle et al. ............... 434/295 |
| 5,922,505 A | 7/1999 | Sonokawa ............... 430/272.1 |
| 6,027,766 A | 2/2000 | Greenberg et al. .......... 427/226 |
| 6,254,396 B1 * | 7/2001 | Stevens ..................... 434/276 |
| 6,258,969 B1 | 7/2001 | Sawai et al. ................ 556/457 |
| 6,537,379 B1 * | 3/2003 | Vajo et al. .................... 134/2 |
| 6,677,063 B2 * | 1/2004 | Finley ........................ 428/701 |
| 7,223,523 B2 | 5/2007 | Boykin et al. ............. 430/273.1 |

FOREIGN PATENT DOCUMENTS

JP 2000-280397 10/2000

OTHER PUBLICATIONS

U.S. Appl. No. 60/305,057, filed Jul. 13, 2001.
U.S. Appl. No. 60/305,191, filed Jul. 13, 2001.
U.S. Appl. No. 10/075,996, filed Feb. 14, 2002.
U.S. Appl. No. 60/411,796, filed Sep. 18, 2002.

* cited by examiner

*Primary Examiner*—Kurt Fernstrom
(74) *Attorney, Agent, or Firm*—Andrew C. Siminerio

(57) ABSTRACT

A method is provided for simulating and/or demonstrating and/or enhancing photoactive properties, such as hydrophilicity, of a surface, such as a photoactive surface. One embodiment includes providing a photoactive surface and applying a peroxide-containing material, such as an aqueous hydrogen peroxide solution, over at least a portion of the surface. An optional resinous layer, such as an at least partly hydrolyzed polymethoxysiloxane layer, can be applied over the surface. A kit to practice the method and an article made using the method are also provided.

12 Claims, 1 Drawing Sheet

DEMONSTRATION KIT AND METHOD FOR ENHANCING AND/OR DEMONSTRATING PHOTOACTIVE PROPERTIES

CROSS REFERENCE TO RELATED APPLICATIONS

This application is a divisional of U.S. application Ser. No. 10/657,350 filed Sept. 8, 2003, which claims the benefits of U.S. Provisional Application Ser. No. 60/411,796 filed Sept. 18, 2002, all of which applications are herein incorporated by reference in their entirety.

BACKGROUND OF THE INVENTION

1. Field of the Invention

This invention relates generally to the demonstration of photoactive properties, such as hydrophilicity, on a surface and, more particularly, to a method and kit to demonstrate and/or simulate one or more photoactive properties of a surface in the absence of or at low levels of activating radiation.

2. Technical Considerations

Photoactive substrates have found widespread acceptance in many fields. These photoactive substrates can be photocatalytic and/or hydrophilic (such as photohydrophilic). By "photoactive" or "photoactively" is meant the capability to generate one or more physical or chemical effects upon exposure to certain wavelengths of electromagnetic energy. These effects can be caused, for example, by the photogeneration of an electron-hole pair when illuminated by activating radiation of a particular frequency. The activating radiation is typically in the ultraviolet (UV) or visible ranges of the electromagnetic spectrum. By "UV range" is meant electromagnetic radiation in the range of 280 nanometers (nm) up to 395 nm. By "visible range" is meant electromagnetic radiation in the range of 395 nm to 800 nm. By "photocatalytic" is meant a surface, such as a coating, having self-cleaning properties. By "self-cleaning" is meant a surface which upon exposure to electromagnetic radiation in the photoabsorption band of the surface material (i.e., activating radiation) interacts with organic contaminants on the surface to degrade or decompose at least some of the organic contaminants. By "hydrophilic" or "hydrophilicity" is meant water wetting. By "photohydrophilic" or "photohydrophilicity" is meant a surface upon which the contact angle of a water droplet decreases with time as a result of exposure of the surface to electromagnetic radiation within the photoabsorption band of the surface (e.g., coating). By "photoabsorption band" is meant the range of electromagnetic radiation absorbed by a material to render the material photoactive. For photohydrophilicity for example, the contact angle of a water droplet on the surface can decrease to a value less than 15°, such as less than 10°, and can become superhydrophilic, e.g., decrease to less than 5°, after exposure to activating radiation in the photoabsorption band of the material for a time period and at an intensity sufficient to activate the material.

While photoactive articles, such as architectural windows having a photoactive surface or coating, provide advantages over non-photoactive articles, problems can arise in demonstrating such photoactive properties and/or articles to a potential customer. For example, many of the commercially available photoactive windows are "UV photoactive", meaning that the windows exhibit photoactivity only upon exposure to electromagnetic radiation in the UV range. Since only about 3% to 5% of the solar energy that reaches the earth's surface is in this wavelength range, the photoactive window to be demonstrated may have to be exposed to solar energy for a sufficient period of time to activate the window before the photoactive properties of the window can be demonstrated to a customer. Other windows are "visibly photoactive", meaning that their photoabsorption band is at least partly in the visible range. By "activate" is meant to expose the photoactive surface to electromagnetic radiation within the photoabsorption band of the photoactive material for a period of time sufficient for the photoactive material to begin to display photoactive properties, such as but not limited to photohydrophilicity and/or photocatalytic activity. This can mean having to maintain a demonstration window outdoors at a particular location and require potential customers to come to that location during daylight hours (when the window is active due to the presence of solar radiation) to demonstrate the benefits of the photoactive surface to the customer. Should it be desired to demonstrate the photoactive window to a customer during the nighttime or indoors, a light source, such as a conventional mercury or black lamp, may be required to provide sufficient energy to render the window photoactive. Such problems are compounded if it is desired to have a salesman visit various customers' locations with a demonstration substrate (such as a sample of a photoactive window or a photoactive substrate) to demonstrate the photoactive properties of the substrate to customers. The salesman may keep the demonstration substrate in his car (such as in the trunk or other areas where the substrate is not accessible to solar energy) and, hence, degrade the photoactivity level of the substrate surface to the point where the photoactive material no longer displays one or more photoactive properties, such as hydrophilicity and/or photocatalysis. This degradation can be caused, for example, by a build-up of contaminants on the surface. Moreover, it would be difficult to demonstrate the photoactive window at night or indoors without requiring the salesman to carry a portable light source to activate the substrate to photocatalytically degrade contaminants on the surface.

Therefore, it would be advantageous to provide a method of demonstrating or simulating at least some of the photoactive properties of a photoactive surface in the absence of or at low levels of activating radiation. It would also be advantageous to simulate at least some photoactive properties, such as hydrophilicity, on a non-photoactive surface.

SUMMARY OF THE INVENTION

A method is provided for simulating and/or demonstrating and/or enhancing at least one photoactive property (such as hydrophilicity) of a photoactive surface. The method includes providing a surface, such as a photoactive surface, and applying at least one peroxide-containing material over at least a portion of the surface. In one embodiment, the surface comprises titania and the peroxide material comprises hydrogen peroxide. In one embodiment, the peroxide coated surface can be exposed to electromagnetic energy having one or more wavelengths in the visible region. Additionally or alternatively, at least one at least partially hydrolyzed polyalkoxysiloxane can be deposited over at least a portion of the surface that has been activated or treated with a material containing hydrogen peroxide.

A method is provided for demonstrating and/or simulating and/or enhancing the hydrophilicity of a surface. The method comprises providing a substrate having a photoactive surface, applying an at least partially hydrolyzed polyalkoxysiloxane material over at least a portion of the surface, and optionally applying at least one peroxide-containing material over at least a portion of the surface.

A method is provided for demonstrating the hydrophilicity of a photoactive surface or coating by exposing the surface to electromagnetic radiation having one or more wavelengths in the visible region. The method includes providing a surface, such as a photoactive surface comprising titania, and applying a peroxide material, such as an aqueous solution comprising 1 wt. % to 30 wt. % hydrogen peroxide, over at least a portion of the photoactive surface.

A method is provided for demonstrating and/or simulating one or more photoactive properties, such as hydrophilicity, on a non-photoactive surface. The method includes providing a non-photoactive surface, such as glass, and applying at least one peroxide-containing material and/or at least one at least partially hydrolyzed polyalkoxysiloxane material over at least a portion of the surface.

A kit is provided for demonstrating and/or simulating the hydrophilicity of a photoactive coating in the absence of or at low levels of activating radiation. The kit includes a container comprising an aqueous peroxide material, such as hydrogen peroxide, and optionally at least one applicator. The kit can also optionally include one or more of a container of an at least partially hydrolyzed polyalkoxysiloxane material (such as at least partially hydrolyzed polymethoxysiloxane), a container of water, one or more applicator pads, a substrate having a surface with at least a portion of the surface comprising a photoactive material, and a stand to hold the substrate. The kit can also be used to simulate photoactive hydrophilicity on a non-photoactive surface.

An article of the invention comprises a surface, such as a UV photoactive surface and/or visible photoactive, and at least one peroxide-containing material and/or at least one at least partially hydrolyzed polyalkoxysiloxane material deposited over the surface. In one embodiment, the surface comprises titania. In one embodiment, the peroxide-containing material comprises hydrogen peroxide. The polyalkoxysiloxane material can comprise at least partially hydrolyzed polymethoxysiloxane.

DESCRIPTION OF THE INVENTION

Figure 1:
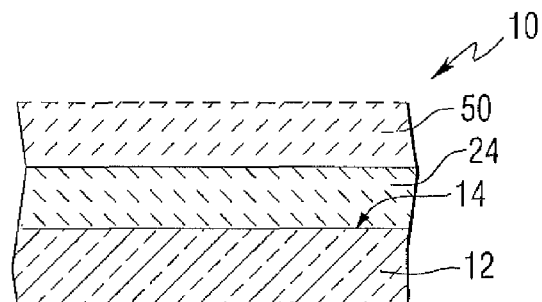
FIG. 1 is a side, sectional view (not to scale) of a portion of a photoactive substrate demonstrating features of the invention.

As used herein, spatial or directional terms, such as "inner", "outer", "above", "below", "top", "bottom", and the like, relate to the invention as it is shown in the drawing figures. However, it is to be understood that the invention may assume various alternative orientations and, accordingly, such terms are not to be considered as limiting. Further, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Further, as used herein, the terms "deposited over" or "provided over" mean deposited or provided on but not necessarily in contact with the surface. For example, a coating "deposited over" a substrate does not preclude the presence of one or more other coating films of the same or different composition located between the deposited coating and the substrate. Additionally, all percentages disclosed herein are "by weight" unless indicated to the contrary. All references referred to herein (such as but not limited to issued patents and patent applications) are to be understood to be incorporated in their entirety. The terms "polymer" or "polymeric" include oligomers, homopolymers, copolymers, and terpolymers.

To describe the general principles of the invention, an exemplary article having a photoactive surface, e.g., a photoactive coating, will first be described and then an exemplary method and kit for demonstrating at least some of the photoactive properties of the surface, e.g., photocatalytic activity and/or hydrophilicity (e.g., photoactive hydrophilicity), in accordance with the invention will be described. In the following discussion, the article will be referred to as an architectural window. However, it is to be understood that the method and/or kit of the invention are not limited to use with photoactive surfaces or architectural windows but can be practiced with any desired substrate, such as but not limited to tile substrates, ceramic substrates, and glass substrates and articles such as but not limited to insulated glass units, and transparencies for air, sea-going, or land vehicles (such as automotive windshields, back lights, sidelights, moon roofs, etc.), just to name a few.

Referring to FIG. 1, there is shown a portion of an article 10 having a substrate 12 with a first major surface 14 and a second major surface 16. The substrate 12 is not limiting to the invention and may be of any desired material having any desired characteristics, such as opaque, translucent, or transparent to visible light. By "transparent" is meant having a transmittance through the substrate of greater than 0% up to 100%. By "visible light" or "visible region" is meant electromagnetic energy in the range of 395 nanometers (nm) to 800 nm. Alternatively, the substrate can be translucent or opaque. By "translucent" is meant allowing electromagnetic energy (e.g., visible light) to pass through the substrate but diffusing this energy such that objects on the side of the substrate opposite to the viewer are not clearly visible. By "opaque" is meant having a visible light transmittance of 0%. Examples of suitable substrates include, but are not limited to, plastic substrates (such as acrylic polymers, such as polyacrylates, polyalkylmethacrylates, such as polymethylmethacrylates, polyethylmethacrylates, polypropylmethacrylates, and the like, polyurethanes, polycarbonates, and polyalkylterephthalates, such as polyethyleneterephthalate (PET), polypropyleneterephthalates, polybutyleneterephthalates, and the like, or copolymers of any monomers for preparing these, or any mixtures thereof); metal substrates; ceramic substrates; tile substrates; glass substrates; or mixtures or combinations thereof. For example, the substrate can be conventional untinted soda-lime-silica-glass, i.e., "clear glass", or can be tinted or otherwise colored glass, borosilicate glass, leaded glass, tempered, untempered, annealed, or heat-strengthened glass. The glass may be of any type, such as conventional float glass or flat glass, and may be of any composition having any optical properties, e.g., any value of visible transmission, ultraviolet transmission, infrared transmission, and/or total solar energy transmission. Types of glass suitable for the practice of the invention are described, for example but not to be considered as limiting, in U.S. Pat. Nos. 4,746,347; 4,792,536; 5,240,886; 5,385,872; and 5,393,593. Additionally, the glass can be a coated glass, such as SUNCLEAN® glass commercially available from PPG Industries, Inc. of Pittsburgh, Pa. Other commercially available glass suitable for use with the invention includes ACTIV® glass commercially available from Pilkington plc Corporation of Great Britain, or RADIANCE® glass or RADIANCE Ti™ glass commercially available from AFG Corporation, or BIOCLEAN™ glass or AQUACLEAN™ glass commercially available from St. Gobain, just to name a few.

In one non-limiting aspect of the invention, one or both of the surfaces 14, 16 can have a photoactive coating 24, such as a photocatalytic or photoactively hydrophilic coating. For example, the photoactive coating 24 can be deposited over at least a portion of the substrate 12, e.g., over all or a portion of the surface 14 and or the surface 16. In one embodiment, the coating 24 can be photocatalytic, hydrophilic (e.g., photoactively hydrophilic), or both. Although photoactive, the coating 24 may not necessarily be photocatalytic to the extent that it is self-cleaning, i.e., may not be sufficiently photocatalytic to decompose organic materials like grime on the coating surface in a reasonable or economically useful period of time, but could still be hydrophilic.

The photoactive coating 24 material can include at least one metal oxide, such as but not limited to, one or more metal oxides or semiconductor metal oxides, such as oxides of titanium, silicon (e.g., silica), aluminum, iron, silver, cobalt, chromium, copper, tungsten, tin, vanadium, or zinc, or mixed oxides, such as zinc/tin oxides (e.g., zinc stannate), strontium titanate and mixtures containing any one or more of the above. The metal oxide can be crystalline or at least partially crystalline. In one exemplary coating 24, the photoactive coating material can be all or at least partly titanium dioxide. Examples of suitable coatings 24 are found in (but are not limited to) U.S. Pat. applications Ser. Nos. 10/075,996 filed Feb. 14, 2002; 60/305,191 filed Jul. 13, 2001; and 60/305,057 filed Jul. 13, 2001. It is to be understood that the coating 24 is not limited to metal oxides but could include one or more nitrides, carbides, or mixtures or combinations thereof, such as but not limited to one or more metal nitrides, metal carbides, metal oxides, or mixtures thereof. Other exemplary coatings that can be utilized in the practice of the invention include the coatings utilized on the commercially available coated glass sold under the trade names as mentioned above.

The coating 24 can be of any desired thickness and can be photocatalytic and/or hydrophilic (such as photoactively hydrophilic). As a general rule, the thickness of the coating 24 to achieve photoactive hydrophilicity can be much less than is needed to achieve a commercially acceptable level of photocatalytic self-cleaning activity. For example, in one embodiment, the coating 24 can have a thickness in the range of 10 Å to 5000 Å, where thicker coatings in this range can have photocatalytic self-cleaning activity for at least some period of time as well as hydrophilicity. As the coatings get thinner in this range, photocatalytic self-cleaning activity typically decreases in relation to performance and/or duration. As coating thickness decreases in such ranges as 50 Å to 3000 Å, e.g., 100 Å to 1000 Å, e.g., 200 Å to 600 Å, e.g., 200 Å to 300 Å, photocatalytic self-cleaning activity may be unmeasurable but photoactive hydrophilicity can still be present in the presence of selected electromagnetic radiation, e.g., activating radiation within the photoabsorption band of the material.

The coating 24 can be deposited directly on, i.e., in surface contact with, the surface 14 of the substrate 12 as shown in FIG. 1. Alternatively, one or more other layers or coatings can be interposed between the coating 24 and the substrate 12, such as but not limited to conventional alkali barrier layers or optical layers. For example, the coating 24 can be an outer or the outermost layer of a multilayer coating stack or the coating 24 can be embedded as one of the layers other than the outermost layer within such a multilayer coating stack. By "an outer layer" is meant a layer receiving sufficient exciting electromagnetic radiation, e.g., radiation within the photoabsorption band of the layer material, to provide the coating 24 with sufficient photoactivity to be at least photoactively hydrophilic if not necessarily photocatalytic. In other non-limiting embodiments, the article 10 can be a piece of commercially available coated glass, such as but not limited to those of the trade names mentioned above.

As discussed above, a problem in demonstrating many commercially available photoactive articles is that the photoactive surface or coating typically has a photoabsorption band in the UV or visible ranges. Therefore, to demonstrate a photoactive article, such as a window, to a potential customer, the photoactive surface needs to be exposed to ultraviolet and/or visible radiation within the photoabsorption band of the material for a sufficient time before the demonstration to render the surface photoactive. If not, the benefits of the photoactive surface, such as photocatalytic activity and/or hydrophilicity, cannot be adequately demonstrated to a customer. Oftentimes, salespeople simply place demonstration panels with a photoactive surface in the trunk of their car or keep them inside an office building where the photoactive surface is not subjected to sufficient activating radiation to maintain the photoactive surface in a photoactive state. Additionally, should a demonstration be scheduled for nighttime or for indoors, special lamps may be required to activate the photoactive coating. Therefore, the invention provides a method of demonstrating and/or simulating and/or enhancing one or more photoactive properties of a photoactive surface, such as a UV and/or visible photoactive surface, in the absence of or at low levels of activating radiation. By "low levels of activating radiation" is meant activating radiation at a level such that the photoactive surface is not rendered photoactive or is not rendered sufficiently photoactive to provide the surface with demonstrable photoactive properties.

In one embodiment of the invention, a peroxide-containing material can be deposited over or applied over at least a portion of the photoactive surface. It has been found that the addition of a peroxide material to an inactive photoactive surface can provide the surface with properties, such as hydrophilicity, similar to that of the surface in a photoactive state. In one embodiment, the photoactive surface can include titania, such as anatase and/or rutile and/or brookite titania and can include one or more dopants such that the photoabsorption band includes one or more wavelengths in the UV and/or visible ranges. In one embodiment, the peroxide material includes hydrogen peroxide. While the reason for this result is not completely understood at this time, it may be due to the hydrogen peroxide reacting with the titania to form Ti—OH sites on the surface. These Ti—OH sites may provide the surface with properties, such as hydrophilicity, simulating that of the surface in a photoactive state.

In one embodiment, an aqueous solution of hydrogen peroxide can be applied over the photoactive surface, e.g., over the coating 24. In one embodiment, the hydrogen peroxide solution can contain between 1 wt. % to 30 wt. % hydrogen peroxide, such as 3 wt. % to 7 wt. %, such as 3 wt. %. The hydrogen peroxide solution can be applied in any conventional manner, such as by spraying or wiping. The hydrogen peroxide solution can be allowed to dry on the surface before demonstrating the photoactivity simulating properties of the surface, such as hydrophilicity. For example, the hydrogen peroxide solution can be dried at ambient temperatures, typically in the range of 50° F. to 90° F. (10° C. to 32° C.) for a time sufficient to vaporize the aqueous solution. Alternatively, the applied aqueous hydrogen peroxide solution can be dried at ambient temperatures for a period in the range of 3 minutes to 60 minutes, such as 5 minutes to 40 minutes, such as 10 minutes. After which, the hydrophilicity of the surface can be demonstrated by spraying or applying distilled or deionized water onto the surface. It is believed that photocatalytic activity may be demonstrated by applying an organic material onto the surface and, optionally, exposing the surface to electromagnetic radiation having one or more wavelengths in the UV and/or visible regions.

Figure 2:
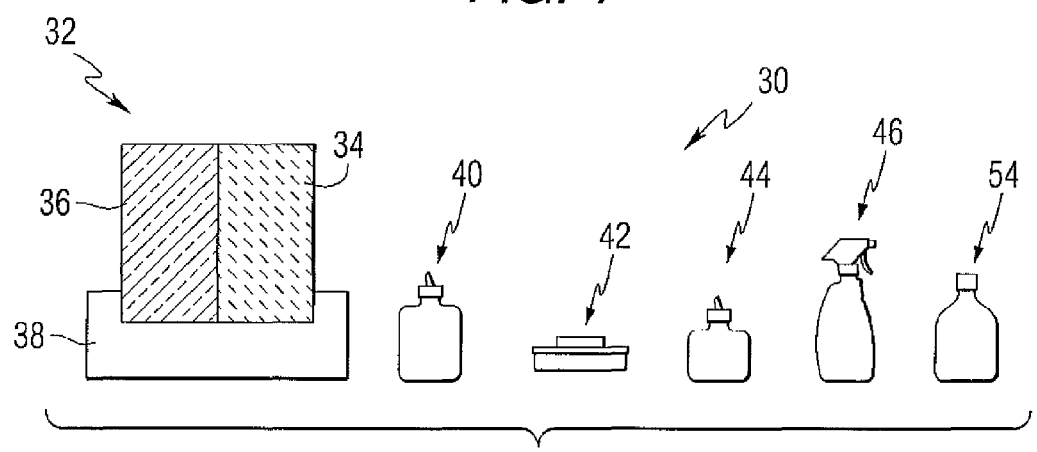
FIG. 2 is a front view of a demonstration kit (not to scale) incorporating features of the invention.

A demonstration kit 30 in accordance with the invention is shown in FIG. 2. The demonstration kit 30 can include a sample substrate 32 with at least a portion 34 of the substrate having a photoactive surface, such as a photoactive coating (e.g., a UV and/or visible photoactive coating), deposited thereon. Another portion 36 of the substrate 32 can be free of photoactive coating and can be present to provide a comparison between the photoactive surface and the non-photoactive surface. The kit 30 can also include a stand 38 to hold the substrate 32 during a demonstration. In a further embodiment, the kit 30 can include a container 40, such as a plastic squeeze bottle, containing an aqueous solution of a peroxide material. In one embodiment, the container 40 includes a 3 wt. % to 7 wt. % aqueous solution of hydrogen peroxide. The kit 30 can further include one or more applicators 42 to apply the peroxide material onto the surface. The applicator 42 can be any material or device to apply the peroxide material, such as but not limited to one or more rigid or foam applicators, sponges, and/or one or more absorbent pads 44 Optionally, the kit 30 can further include a container 46, such as a plastic squeeze bottle, containing water to be used to demonstrate the hydrophilicity of the surface. Optionally, the kit can further include a glass cleaning solution, such as Windex® brand window cleaner commercially available from SC Johnson. The various elements of the kit 30 can be provided in a carrying case, a bag, or similar device.

While the above demonstration method works well, it has been found that after the hydrogen peroxide solution is applied to the photoactive surface 34 and the surface 34 has been sprayed with water about 4 or 5 times to demonstrate the hydrophilicity of the surface, the contact angle of water on the surface begins to rise. This may be due to the accumulation of contaminants on the surface 34. Therefore, in a further embodiment of the invention and as shown in FIG. 1, a thin layer of a resinous material 50 can be applied over the photoactive coating 24 to increase the number of times the substrate (e.g., the photoactive portion 34) can be sprayed with water to demonstrate hydrophilicity before having to again refresh the surface with hydrogen peroxide. By "refresh the surface" is meant reapplying peroxide material until the surface again displays hydrophilicity. In one embodiment, the resinous material 50 can include a siloxane material, such as an at least partly hydrolyzed siloxane material such as an at least partly hydrolyzed polyalkoxysiloxane material. By "at least partly hydrolyzed" is meant that at least a portion of the alkoxy groups (e.g., —OCH$_3$ groups) are replaced with (—OH) groups. For example, the polyalkoxysiloxane can be greater than 50% hydrolyzed, such as greater than 60% hydrolyzed, such as greater than 70% hydrolyzed, such as in the range of 80% to 100% hydrolyzed. Examples of suitable hydrolyzed or partly hydrolyzed polyalkoxysiloxane materials include, but are not limited to, at least partly hydrolyzed polymethoxysiloxane, polyethoxysiloxane, polypropoxysiloxane, and/or polybutoxysiloxane. The siloxane material can be provided in an aqueous solution and can be applied onto the photoactive surface in any conventional manner, such as by spraying or wiping. One example of a suitable siloxane material is MKC Silicates MS-1200® (hereinafter "MS-1200®") commercially available from Mitsubishi Chemical America, Inc. of White Plains, N.Y. MS-1200® is comprised of the reaction products of the acid catalysis of tetramethylorthosilicate to partially hydrolyzed polymethoxysiloxane in a solution of water, methanol, and ethanol. The at least partly hydrolyzed siloxane material can be applied over the photoactive surface 34 and then dried in any conventional manner, such as by air drying at ambient temperatures for a time sufficient to dry the applied siloxane material. In one embodiment, the siloxane material can be dried at ambient temperatures for a period of one minute to greater than or equal to 2 hours. Alternatively, the siloxane material can be dried at ambient temperatures for a period of 1 minute to 60 minutes, such as 5 minutes to 60 minutes, such as 20 minutes to 40 minutes, such as 30 minutes and then optionally heated to a temperature of about 40° C. to 100° C., such as 45° C. to 80° C., such as 45° C. to 60° C., such as 50° C. for about one minute to 60 minutes, such as 5 minutes to 60 minutes, such as 20 minutes to 40 minutes, such as 30 minutes to dry the siloxane material, remove the solvent and/or acid, and promote good bonding to the surface. The siloxane material can be applied to any thickness so as not to adversely impact upon the photoactive characteristics, such as photocatalysis and/or hydrophilicity (e.g., photohydrophilicity) of the underlying photoactive coating. In one embodiment, the siloxane material can be applied to provide a siloxane layer having a thickness of less than or equal to 10 nm, such as less than or equal to 5 nm, such as less than or equal to 4 nm, such as less than or equal to 3 nm, such as in the range of 2 nm to 3 nm.

After the siloxane material has been applied over the photoactive surface, a peroxide material, such as an aqueous hydrogen peroxide solution as described above, can be applied over the siloxane coating. The resultant article has been found to exhibit or simulate photoactive characteristics, such as hydrophilicity, when exposed to electromagnetic radiation having one or more wavelengths in the visible region. Additionally, the siloxane material at estimated thickness of less than or equal to 5 nm has been demonstrated not to adversely impact upon the photocatalytic activity of the underlying photoactive coating (see FIG. 3).

In this aspect of the invention, the kit 30 shown in FIG. 2 can further include a container 54 containing a siloxane material, such as an at least partially hydrolyzed polyalkoxysiloxane solution (e.g., a partially hydrolyzed polymethoxysiloxane, polyethoxysiloxane, or polypropoxysiloxane, solution, or mixtures thereof), as described above. This polyalkoxysiloxane solution can be applied to the surface of the substrate as described above before demonstrating the substrate to a potential customer. In one embodiment, the at least partly hydrolyzed polymethoxysiloxane material comprises less than 1 weight percent MS-1200®, such as less than 0.8 weight percent MS-1200®, such as less than 0.5 weight percent MS-1200®, such as 0.1 weight percent MS-1200® in water.

In the exemplary embodiments discussed above, the peroxide material and/or the at least partially hydrolyzed siloxane material were deposited over a substrate having a photoactive coating. However, in another aspect of the invention, the peroxide material and/or the siloxane material can be deposited over a non-photoactive substrate, such as a piece of clear glass, to simulate the hydrophilic effect of an activated photoactive surface. For example, the siloxane material can be deposited directly onto a piece of clear glass and allowed to dry. The coated glass can then be contacted with water. It has been found that the water, if it has a contact angle of less than about 20°, appears to wet-out the surface and can be used to demonstrate what the property of photoactive hydrophilicity will appear like with an activated photoactive surface.

In another aspect of the invention, a peroxide solution, such as described above, can be used to clean an installed window having a photoactive surface to provide immediate hydrophilicity even in the absence of photoactive activity. For example, if an installed window having a photoactive surface (e.g., a titania-containing surface) ceases to demonstrate photoactive properties, such as hydrophilicity, due to the accumulation of contaminants, the surface can be cleaned with a peroxide solution such as described above to remove the contaminants. The peroxide material can interact with the surface, such as to form Ti—OH sites as described above, to provide hydrophilicity at least for part of the time while the photoactive surface becomes active again.

The general concepts of the invention will be further described with reference to the following examples. However, it is to be understood that the following examples are merely illustrative of the general concepts of the invention and are not intended to be limiting.

EXAMPLE 1

This example illustrates a method to demonstrate or simulate hydrophilic properties of a photoactive surface utilizing hydrogen peroxide when the photoactive surface is inactive or is exposed to electromagnetic radiation in the visible region.

Two 4 inch by 4 inch (10 cm by 10 cm) SUNCLEAN® coated glass substrates (samples 1 and 2) and two 4 inch by 4 inch (10 cm by 10 cm) substrates of clear float glass (samples 3 and 4) obtained from PPG Industries, Inc. of Pittsburgh Pa. The SUNCLEAN® glass substrates were exposed to UV radiation for a sufficient time to render the substrates photoactive. The clear float glass substrates were polished with a slurry of cesium oxide. The contact angle of a water drop was then measured on both the polished float glass and SUNCLEAN® surfaces. For each substrate, five contact angle measurements were made and the results are shown in Table 1 below. As can be seen, the activated SUNCLEAN® glass had lower contact angle measurements than the polished float glass.

TABLE 1

Contact Angle Measurements

| Sample | 1 | 2 | 3 | 4 | 5 | Average |
|---|---|---|---|---|---|---|
| 1 | 2° | 3° | 2° | 8° | 4° | 4° |
| 2 | 5° | 2° | 15° | 5° | 7° | 7° |
| 3 | 10° | 6° | 10° | 11° | 9° | 9° |
| 4 | 16° | 10° | 9° | 10° | 10° | 10° |

Next, the substrates were placed in a laboratory (without access to solar radiation) for a period of about 12 hours to deactivate or decrease the hydrophilicity of the SUNCLEAN® glass. The contact angle measurements were repeated and the results of these measurements are shown in Table 2 below. As shown in Table 2, the deactivated SUNCLEAN® glass had higher contact angle measurements than the activated SUNCLEAN® glass reported in Table 1.

TABLE 2

Contact Angle Measurements

| Sample | 1 | 2 | 3 | 4 | 5 | Average |
|---|---|---|---|---|---|---|
| 1 | 30° | 31° | 30° | 44° | 34° | 34° |
| 2 | 44° | 58° | 44° | 38° | 40° | 45° |
| 3 | 20° | 25° | 23° | 20° | 21° | 22° |
| 4 | 23° | 20° | 20° | 19° | 20° | 20° |

Next, a 3 wt. % aqueous hydrogen peroxide solution (commercially available from the Cumberland Swan Company) was applied to the deactivated SUNCLEAN® glass substrates and clear glass substrates. The peroxide solution was poured onto the substrate surfaces and then wiped with a BloodBloc pad (commercially available from Fisher Scientific). The aqueous peroxide solution was applied until the surfaces achieved wet-out. By "wet-out" is meant that a substantially uniform layer of the peroxide solution was formed over the surface without pooling, beading, or pull-back along the edges. The peroxide liquid was dried at ambient temperature for about 3 to 5 minutes and then contact angle measurements were again taken on the substrates in the laboratory (i.e., in the absence of direct solar radiation). The results of these contact angle measurements are shown in Table 3 below.

TABLE 3

Contact Angle Measurements

| Sample | 1 | 2 | 3 | 4 | 5 | Average |
|---|---|---|---|---|---|---|
| 1 | 8° | 6° | 11° | 10° | 8° | 9° |
| 2 | 15° | 9° | 11° | 13° | 16° | 11° |
| 3 | 25° | 25° | 24° | 27° | 23° | 25° |
| 4 | 28° | 30° | 28° | 30° | 23° | 28° |

As shown in Table 3, the deactivated SUNCLEAN® glass substrates with the hydrogen peroxide solution displayed much lower contact angle results than for the clear glass substrates. However, it should be noted that the hydrogen peroxide coated deactivated SUNCLEAN® glass still had higher contact angle results than the photoactivated SUNCLEAN® glass samples of Table 1.

EXAMPLE 2

This example illustrates the use of a thin, durable resinous coating applied over a substrate to simulate the hydrophilicity of an activated substrate even in the absence of solar radiation. The presence of the resinous coating does not appear to adversely impact upon the photoactivity of an underlying photoactive coating, if present, and the presence of the resinous coating appears to maintain the hydrophilicity of the article for more subsequent water washes than the direct hydrogen peroxide application method described in Example 1.

Samples of SUNCLEAN® glass substrates were obtained from PPG Industries, Inc. of Pittsburgh, Pa. In the following experiment, the SUNCLEAN® glass was in a deactivated state. Two of the samples (samples 5 and 6) were used as controls. Three of the samples (samples 7, 8, and 9) were coated with a resinous coating in the following manner. The substrates were cleaned on both sides using a diluted Dart- 210 cleaning solution (commercially available from Madison Chemical Company, Inc.) and then rinsed with distilled water. The substrates were laid (coating side up) on a clean, lint-free surface and wiped with TechniCloth® wipes (commercially available from Texwipe Company, llc). The substrates were then cleaned with Windex® brand window cleaner (commercially available from SC Johnson) and wiped with a Kaydry wipe (commercially available from Kimberly Clark Company). A 4 inch by 4 inch (10 cm by 10 cm) BloodBloc pad (commercially available from Fisher Scientific) was wrapped around a foam applicator with the fiber side out. Approximately 1.5 ml of 3 wt. % hydrogen peroxide solution was placed on the pad and applied onto the substrate by wiping the pad over the substrate using overlapping strokes. The hydrogen peroxide solution was applied until the solution wet-out the substrate. The hydrogen peroxide solution was then air dried at ambient temperature (about 70° F. (21° C.) for about 3 minutes to 10 minutes.

To form the resinous coating, a 0.1 wt. % solids aqueous solution of MS-1200® was prepared by commercially purchasing a 1 wt. % container of MS-1200® and diluting the commercially available liquid with a mixture of 50 volume percent distilled water and 50 volume percent 2-propanol to form a 0.1 wt. % aqueous solution of MS-1200®. A fresh BloodBloc pad was wrapped around the foam applicator with the fiber side out and approximately 1.5 ml of the 0.1 wt. % MS-1200® solution was applied to the pad. The pad was wiped across the glass surface using overlapping strokes until the glass was coated. The applied MS-1200® coating was allowed to air dry at ambient temperature for between 5 minutes to 30 minutes. The substrates were then placed in an oven and heated to 50° C. for 30 minutes. After which, the glass substrates were removed from the oven and allowed to cool to ambient conditions.

A third set of samples (samples 10, 11, and 12) was prepared in similar manner as described above for samples 7-9 but were allowed to cure under the exposure of UVA-340 irradiation at 28W/m².

Additionally, samples 5-12 were tested for photocatalytic activity by using a conventional stearic acid test. A detailed description of the stearic acid test is disclosed, for example, in U.S. Pat. No. 6,027,766, herein incorporated by reference. The results of these tests are shown in FIG. 3.

Figure 3:
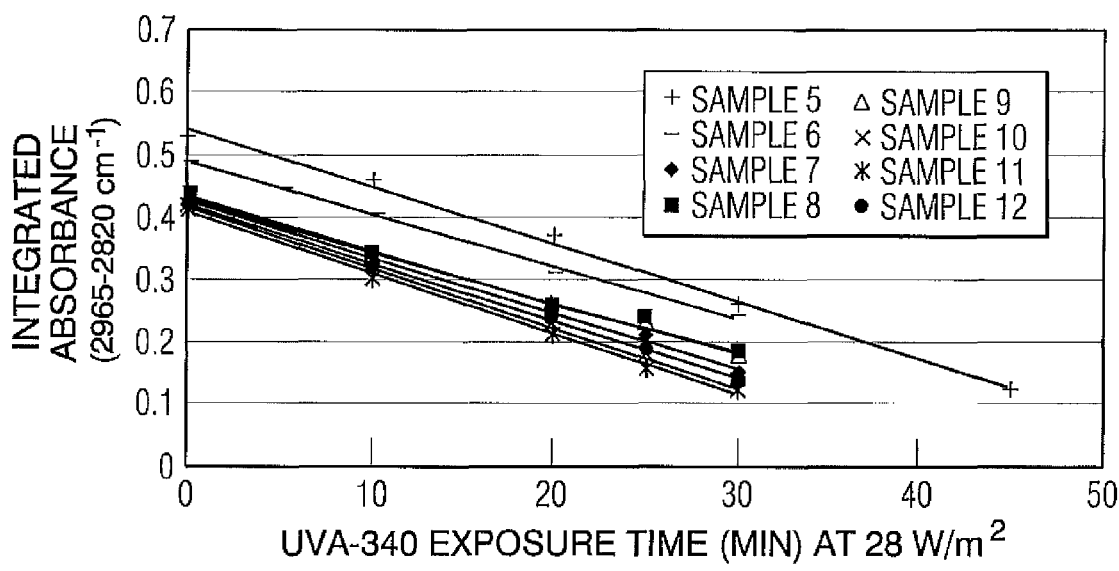
FIG. 3 is a graph of absorbance versus UV exposure time for several sample substrates incorporating features of the invention.

The results of these tests are shown in FIG. 3. When absorbance of the —$CH_2$ stretching band from 2965 cm$^{-1}$ to 2820 cm$^{-1}$ of the stearic acid is followed as a function of UVA-340 exposure, the rate of decomposition is proportional to the slope of the linear fit. These results (shown in Table 4 below) indicate that the MS-1200® coating did not significantly hinder or accelerate the rate of photocatalytic decomposition of the stearic acid.

TABLE 4

|  | Linear Regression Fit y = mx + b | $R^2$ | Photoactivity (−m × 1000) cm$^{-1}$/min |
|---|---|---|---|
| Sample 5 | y = −0.009x + 0.541 | 0.995 | 9 |
| Sample 6 | y = −0.008x + 0.487 | 0.996 | 8 |
| Sample 7 | y = −0.009x + 0.424 | 0.995 | 9 |
| Sample 8 | y = −0.008x + 0.427 | 0.995 | 8 |
| Sample 9 | y = −0.008x + 0.415 | 0.994 | 8 |
| Sample 10 | y = −0.010x + 0.419 | 0.998 | 10 |
| Sample 11 | y = −0.010x + 0.404 | 0.997 | 10 |
| Sample 12 | y = −0.009x + 0.415 | 0.993 | 9 |

EXAMPLE 3

This example illustrates that a hydrophilic surface can be obtained on a deactivated photoactive coating without direct solar electromagnetic radiation.

A 10 inch by 9 inch (25 cm by 23 cm) piece of SUN-CLEAN® coated glass was obtained from PPG Industries, Inc. and kept in a laboratory without access to solar radiation for 2 days to ensure the glass was not photoactive. The contact angle of a water droplet on this glass was measured to be 47°. The glass was then placed in a dark room (without exposure to visible or UV radiation) and a 3 wt. % hydrogen peroxide aqueous solution was applied over the coated glass as described in Example 1. Infrared light was used during this experiment so that the glass was not exposed to either UV or visible light. After application of the hydrogen peroxide solution, the contact angle of the water droplet was measured to be 8°. Thus, the hydrophilic surface provided by the application of hydrogen peroxide onto a titania-containing coating would appear to be formed even in the absence of both UV and visible light.

EXAMPLE 4

This example demonstrates the effect of hydrogen peroxide treatment with a photoactive substrate having different concentrations of MS-1200® under two different curing methods.

4 inch by 4 inch (10 cm by 10 cm) samples of SUN-CLEAN® coated glass (commercially available from PPG Industries, Inc.) were obtained and an aqueous layer of MS-1200 ® was applied to the substrates as described above in Example 2 but at different wt. % concentrations of MS-1200® as shown in Table 5. After application of the MS-1200®, the substrates were dried (e.g., cured) in two different manners. In one method, the substrates were heated to a temperature of 50° C. for 30 minutes to dry the MS-1200® liquid. In the second method, the MS-1200® coated substrates were simply allowed to air dry at ambient temperature for a period of about 12 hours.

Table 5 below shows the contact angle results for a water droplet on the coated substrates before and after 3 wt. % hydrogen peroxide application with different concentrations of MS-1200® under different curing conditions.

TABLE 5

| | Contact Angles | | | |
|---|---|---|---|---|
| % solids | 50° C. cure | | Ambient overnight cure | |
| MS-1200 ® | before | after | before | after |
| 0.1 | 26° | 9° | 26° | 10° |
| 0.15 | 25° | 10° | 22° | 9° |
| 0.2 | 23° | 10° | 22° | 10° |
| 1 | 23° | 9° | 27° | 9° |

EXAMPLE 5

A 6 inch by 12 inch (15 cm by 30 cm) piece of SUN-CLEAN® coated glass was coated with a 0.2 wt. % MS-1200® liquid as described above in Example 2. The coated glass was exposed to sunlight outdoors for 2 hours and the contact angle of a water droplet on the coated glass surface was measured to be 4°. This suggests that 0.2 wt. % of the MS-1200® coating will not adversely affect the hydrophilicity and photoactivity of the titania coating.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A kit for demonstrating hydrophilicity of a surface, comprising:
    a substrate having a surface, with a photoactive coating provided over at least a portion of the surface;
    a container comprising an aqueous peroxide material; and
    a container comprising an at least partly hydrolyzed siloxane material.

2. The kit of claim 1, wherein the substrate surface has a first portion having the photoactive coating and a second portion free of the photoactive coating.

3. The kit of claim 1, wherein the photoactive coating includes at least one metal oxide.

4. The kit of claim 3, wherein the at least one metal oxide is selected from the group consisting of one or more oxides of titanium, silicon, aluminum, iron, silver, cobalt, chromium, copper, tungsten, tin, vanadium, zinc, and mixtures thereof.

5. The kit of claim 3, wherein the at least one metal oxide is at least partly crystalline.

6. The kit of claim 3, wherein the at least one metal oxide comprises titanium dioxide.

7. The kit of claim 1, wherein the peroxide material comprises hydrogen peroxide.

8. The kit of claim 1, wherein the at least partly hydrolyzed siloxane material comprises an aqueous solution comprising at least one at least partly hydrolyzed polyalkoxysiloxane material.

9. The kit of claim 8, wherein the solution comprises from 0.1 wt. % to 5 wt. % of at least partly hydrolyzed polymethoxysiloxane.

10. A kit for demonstrating hydrophilicity of a surface, comprising:
    a substrate having a surface, with a photoactive coating provided over at least a portion of the surface, wherein the photoactive coating includes at least one metal oxide selected from the group consisting of one or more oxides of titanium, silicon, aluminum, iron, silver, cobalt, chromium, copper, tungsten, tin, vanadium, zinc, and mixtures thereof;
    a container comprising an aqueous peroxide material, wherein the peroxide material comprises hydrogen peroxide; and
    a container comprising an at least partly hydrolyzed siloxane material, wherein the at least partly hydrolyzed siloxane material comprises an aqueous solution comprising at least one at least partly hydrolyzed polyalkoxysiloxane material.

11. The kit of claim 10, wherein the siloxane material comprises from 0.1 wt. % to 5 wt. % of at least partly hydrolyzed polymethoxysiloxane.

12. A kit for demonstrating hydrophilicity of a surface, comprising:
    a substrate having a surface, with a photoactive coating provided over a first portion of the surface and with a second portion of the surface being free of the photoactive coating, wherein the photoactive coating comprises titanium dioxide;
    a container comprising an aqueous peroxide material comprising hydrogen peroxide; and
    a container comprising an aqueous solution comprising 0.1 wt. % to 5 wt. % of at least partly hydrolyzed polymethoxysiloxane.

* * * * *